(12) United States Patent
Parsons et al.

(10) Patent No.: US 11,092,739 B2
(45) Date of Patent: Aug. 17, 2021

(54) METHOD OF DIFFERENTIAL MODE DELAY MEASUREMENT ACCOUNTING FOR CHROMATIC DISPERSION

(71) Applicant: COMMSCOPE TECHNOLGOIES LLC, Hickory, NC (US)

(72) Inventors: Earl R. Parsons, Allen, TX (US); Randall L. Patterson, Wylie, TX (US); Peter Berggren Kidd, Murphy, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/608,590

(22) PCT Filed: Apr. 24, 2018

(86) PCT No.: PCT/US2018/029164
§ 371 (c)(1),
(2) Date: Oct. 25, 2019

(87) PCT Pub. No.: WO2018/200540
PCT Pub. Date: Nov. 1, 2018

(65) Prior Publication Data
US 2020/0057191 A1    Feb. 20, 2020

Related U.S. Application Data

(60) Provisional application No. 62/491,685, filed on Apr. 28, 2017.

(51) Int. Cl.
*G02B 6/028* (2006.01)
*H04B 10/2513* (2013.01)
*G02B 6/42* (2006.01)

(52) U.S. Cl.
CPC ....... *G02B 6/0288* (2013.01); *H04B 10/2513* (2013.01); *G02B 6/42* (2013.01)

(58) Field of Classification Search
None
See application file for complete search history.

(56) References Cited

U.S. PATENT DOCUMENTS 8,489,369 B2    7/2013  Lane et al.
9,871,584 B2 *  1/2018  Molin .................. G01M 11/332
(Continued)

OTHER PUBLICATIONS

International Search Report and Written Opinion of the International Searching Authority for International Patent Application No. PCT/US2018/029164 dated Jul. 12, 2018, 10 pages.

(Continued)

*Primary Examiner* — Tina M Wong
(74) *Attorney, Agent, or Firm* — Merchant & Gould P.C.

(57) ABSTRACT

A method of characterizing a multimode optical fiber results in a measure of estimated modal bandwidth (EMB) that is independent of the bandwidth of the light used in the characterization. The method includes propagating pulses of light along the multimode optical fiber at prescribed radial positions relative to an optical axis of the multimode optical fiber and detecting output pulses from the multimode optical fiber corresponding to the pulses of light propagated along the multimode optical fiber at the prescribed radial positions relative to the optical axis of the multimode optical fiber. An estimated modal bandwidth of the multimode optical fiber is calculated in a manner that accounts for chromatic dispersion of the multimode optical fiber.

8 Claims, 8 Drawing Sheets

(56) References Cited

U.S. PATENT DOCUMENTS

| | | |
|---|---|---|
| 2010/0028020 A1 | 2/2010 | Gholami et al. |
| 2010/0040336 A1 | 2/2010 | Chen et al. |
| 2011/0103796 A1 | 5/2011 | Mazzini et al. |
| 2013/0100437 A1* | 4/2013 | Molin ............... H04B 10/073 |
| | | 356/51 |
| 2014/0204367 A1 | 7/2014 | Tudury et al. |
| 2015/0086161 A1* | 3/2015 | Bickham ............. G02B 6/268 |
| | | 385/31 |
| 2016/0025923 A1* | 1/2016 | Castro ............. G02B 6/02257 |
| | | 385/124 |
| 2016/0041332 A1* | 2/2016 | Pimpinella ........... G06F 30/00 |
| | | 385/124 |
| 2020/0057191 A1* | 2/2020 | Parsons ............. G01M 11/338 |
| 2020/0174183 A1* | 6/2020 | Pimpinella ......... H04B 10/2581 |

OTHER PUBLICATIONS

Extended European Search Report for corresponding European Patent Application No. 18789865.5 dated Dec. 11, 2020, 11 pages.
Gloge, D. et al., "Baseband Characteristics of Long-Wavelength L.E.D. Systems", Electronics Letters, 16(10): 366-367 (May 1980).
"CommScope WBMMF Testing Certified by Intertek: Believed to be industry's first confirmed successful test of wavelengths beyond 850 nm", CommScope, Press Release, 7 pages (Aug. 2016); obtained from the Internet: https://www.comscope/com/NewsCenter/PressRelease/CommScope-WBMMF-Testing-Certified-by-Intertek/.

\* cited by examiner

METHOD OF DIFFERENTIAL MODE DELAY MEASUREMENT ACCOUNTING FOR CHROMATIC DISPERSION

CROSS-REFERENCE TO RELATED APPLICATION

This application is a National Stage Application of PCT/US2018/029164, filed on Apr. 24, 2018, which claims the benefit of U.S. Patent Application Ser. No. 62/491,685, filed on Apr. 28, 2017, the disclosures of which are incorporated herein by reference in their entireties. To the extent appropriate, a claim of priority is made to each of the above disclosed applications.

BACKGROUND OF THE INVENTION

The present invention is generally directed to optical communications, and more specifically to improved methods of characterizing optical fibers for optical communications.

Multimode optical fiber is commonly used in optical communications systems covering relatively short distances, for example a building or a campus, typically of the order of one or two kilometers or less. Such systems are capable of complying with 10 Gigabit Ethernet (10GigE) standards such as the IEEE 802.3ae-2002 standard and related 802.3 standards at higher data rates. Such systems have typically used multimode fibers operating with light at a single wavelength, for example OM3 and OM4 fibers. Methods of characterizing OM3 and OM4 fibers are well established.

Wideband multimode fibers, such as OM5 fibers, have recently been introduced to address increasing demand for information bandwidth. These fibers permit operation at multiple wavelengths, allowing wider bandwidth communications through the use of wavelength multiplexing. The methods of characterizing these wideband multimode fibers have been adopted from the methods used for characterizing OM3 and OM4 fibers, however it has been found that this simple adoption does not result in adequately consistent characterization of a wideband, multimode fiber.

Accordingly, the present invention is directed to a method that can be used to characterize a wideband, multimode fiber more consistently.

SUMMARY OF THE INVENTION

One embodiment of the invention is directed to a method of characterizing a multimode optical fiber that preferably results in a measure of estimated modal bandwidth (EMB) that is independent of the bandwidth of the light used in the characterization. The method includes propagating pulses of light along the multimode optical fiber at prescribed radial positions relative to an optical axis of the multimode optical fiber and detecting output pulses from the multimode optical fiber corresponding to the pulses of light propagated along the multimode optical fiber at the prescribed radial positions relative to the optical axis of the multimode optical fiber. An estimated modal bandwidth of the multimode optical fiber is calculated in a manner that accounts for chromatic dispersion of the multimode optical fiber.

Another embodiment of the invention is a method of characterizing a multimode optical fiber that includes propagating pulses of light along the multimode optical fiber at prescribed radial positions relative to an optical axis of the multimode optical fiber. Output pulses from the multimode optical fiber are detected, corresponding to the pulses of light propagated along the multimode optical fiber at the prescribed radial positions relative to the optical axis of the multimode optical fiber. An estimated modal bandwidth (EMB) of the multimode optical fiber is calculated in a manner that the calculated value of EMB is independent of the spectral width the pulses of light.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Figure 1:
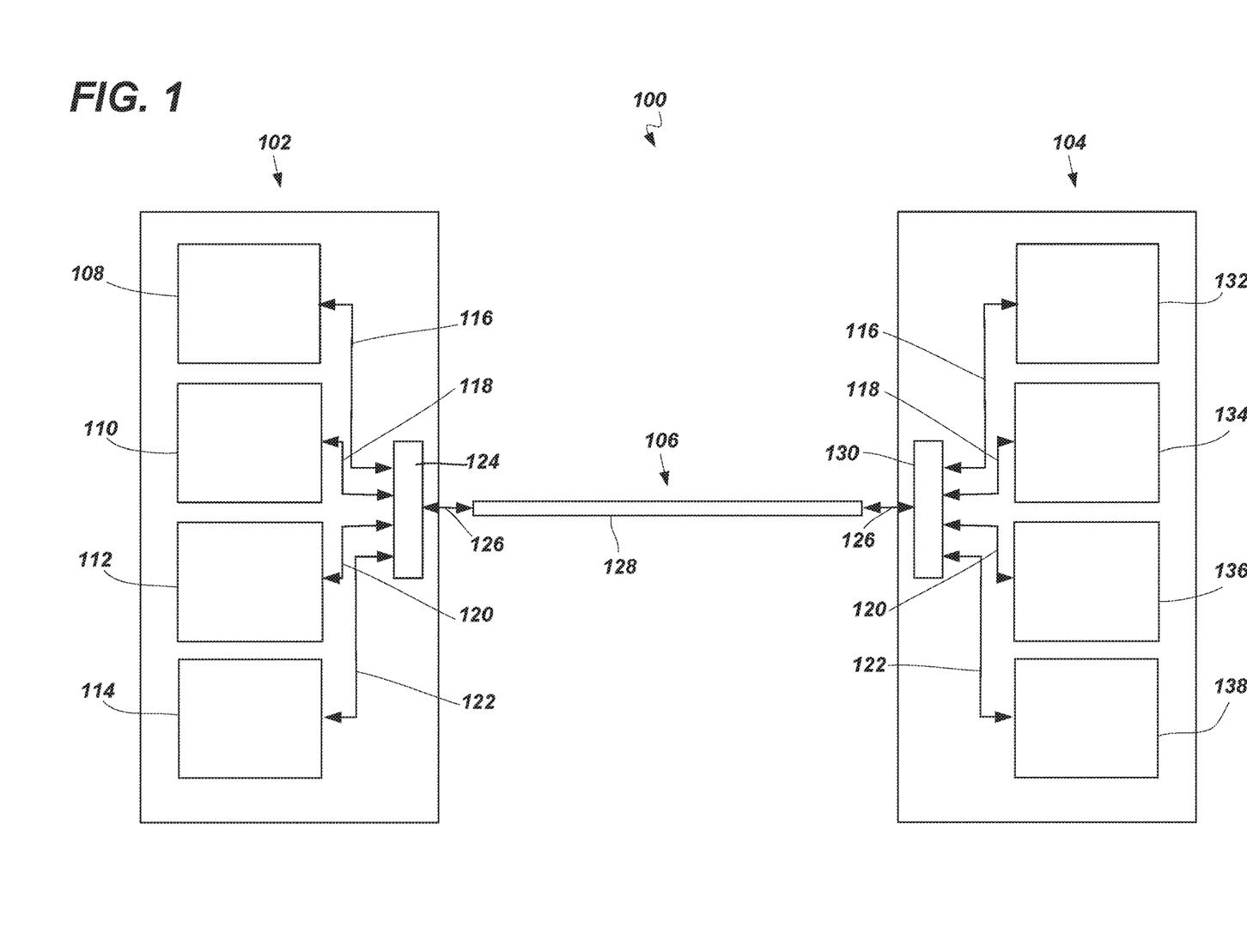
FIG. 1 schematically illustrates an embodiment of an optical communications system that uses wavelength multiplexing to propagate optical communications signals along a single optical fiber at different wavelengths.

An exemplary embodiment of an optical communication system 100 is schematically illustrated in FIG. 1. The optical communication system 100 generally has a transmitter portion 102, a receiver portion 104, and a fiber optic portion 106. The fiber optic portion 106 is coupled between the transmitter portion 102 and the receiver portion 104 for transmitting an optical signal from the transmitter portion 102 to the receiver portion 104.

In this embodiment, the optical communication system 100 is of a wavelength-division multiplexing (WDM) design. Optical signals are generated at different wavelengths within the transmitter portion 102 and are combined into a multi-wavelength signal that is transmitted along the fiber optical portion 106 to the receiver portion 104 where the signals at each different wavelength are separated and directed to respective detectors. The illustrated embodiment shows an optical communication system 100 that multiplexes signals at four different wavelengths, although it will be appreciated that optical communications systems may multiplex signals at a different number of wavelengths.

Transmitter portion 102 has multiple transmitter units 108, 110, 112, 114 producing respective optical signals 116, 118, 120, 122 at respective wavelengths $\lambda 1$, $\lambda 2$, $\lambda 3$, $\lambda 4$. The optical communication system 100 may operate at any useful wavelength, for example in the range 800-950 nm, or over other wavelength ranges. Each transmitter unit 108, 110, 112, 114 is coupled to the optical fiber system 106 via a wavelength multiplexer 124, which combines the optical signals 116, 118, 120, 122 into a single, multiple-wavelength signal 126 that is injected into a single optical fiber 128 of the optical fiber system 106.

The multiple-wavelength optical signal propagates along the optical fiber system 106 to the receiver portion 104, where it is split into the optical signals 116, 118, 120, 122 at the respective wavelengths $\lambda 1$, $\lambda 2$, $\lambda 3$, $\lambda 4$ by a wavelength demultiplexer 130, which are transmitted to respective receiver units 132, 134, 136, 138. Thus, according to this embodiment, the transmitter unit 108 produces an optical signal 116 at $\lambda 1$, which is transmitted to the receiver unit 132, the transmitter unit 110 produces an optical signal 118 at $\lambda 2$, which is transmitted to the receiver unit 134, the transmitter unit 112 produces an optical signal 120 at $\lambda 3$, which is transmitted to the receiver unit 136, and the transmitter unit 114 produces an optical signal 122 at $\lambda 4$, which is transmitted to the receiver unit 138, with all of the optical signals 116, 118, 120, 122 propagating along the same optical fiber 128.

It will be appreciated that the spectrum of an optical signal that is described as having a particular wavelength may, in fact, cover a range of wavelengths that encompass the particular wavelength. For example, if an optical signal is described as being at a wavelength $\lambda 1$, it may actually have spectral components whose 3 dB points (FWHM) are at $\pm\Delta\lambda 1$, i.e. the optical signal propagates with a spectrum having a FWHM range of $2\Delta\lambda 1$.

Furthermore, it will be appreciated that in many optical communications systems, there are optical signals propagating in both directions along an optical fiber. This possibility is indicated in FIG. 1, where the optical signals are designated with double-headed arrows. In such a case, the transmitter units and receiver units may be replaced by transceiver units that generate and receive signals at a particular wavelength. In other embodiments, there may be a separate transmitter unit and receiver unit for a signal at a particular wavelength at each end of the optical fiber system 106.

In some embodiments, typically where signals are transmitted over a distance greater than a kilometer, the optical fiber 128 is a single mode optical fiber. In other applications, for example where the optical signals are transmitted over a distance of several meters to around a kilometer, the optical fiber 128 may be a multimode fiber Modal dispersion describes the phenomenon where optical pulses in different modes of an optical fiber propagate along the fiber at different speeds. Where the optical signal propagates along a multimode fiber, modal dispersion results in a "spreading out" of the optical pulses that constitute the digital optical signal. The amount of pulse spreading is linearly dependent on distance traveled along the fiber, making it increasingly more difficult to distinguish between successive optical pulses in the signal train when the fiber is longer. Hence, multimode fibers are typically used for short-haul applications where the modal dispersion does not significantly affect signal quality. Furthermore, where there is only one propagating mode, as in a single mode fiber, modal dispersion is not a significant limitation on fiber length, and so single mode fibers are typically used for long-haul applications.

In view of the above, it is important to be able to correctly characterize the modal dispersion characteristics of a multimode optical fiber used in an optical communications system, in order to determine whether or not it is suitable for transmitting signals over a desired distance. One common method of characterizing the transfer function of an optical fiber that takes modal dispersion into account uses a differential mode delay (DMD) measurement system 200 like that shown in FIG. 2. The DMD measurement system 200 includes a laser transmitter 202 that produces light pulses 203 of a known length, $\tau_p$, and known wavelength, $\lambda_p$. The light pulses 203 are directed into the input end 204 of the fiber 206 being characterized. A first detector 208 detects the laser pulses propagating out of the output end 210 of the fiber 206. The first detector 208 is connected to an analytical unit 212, for example an oscilloscope or digitizer, that measures the laser pulses. The analytical unit 212 may store the pulses detected by the first detector 208. In some embodiments, a trigger signal may be produced by directing a portion of the light pulses using a beam splitter 214 to a second detector 216.

Figure 2:
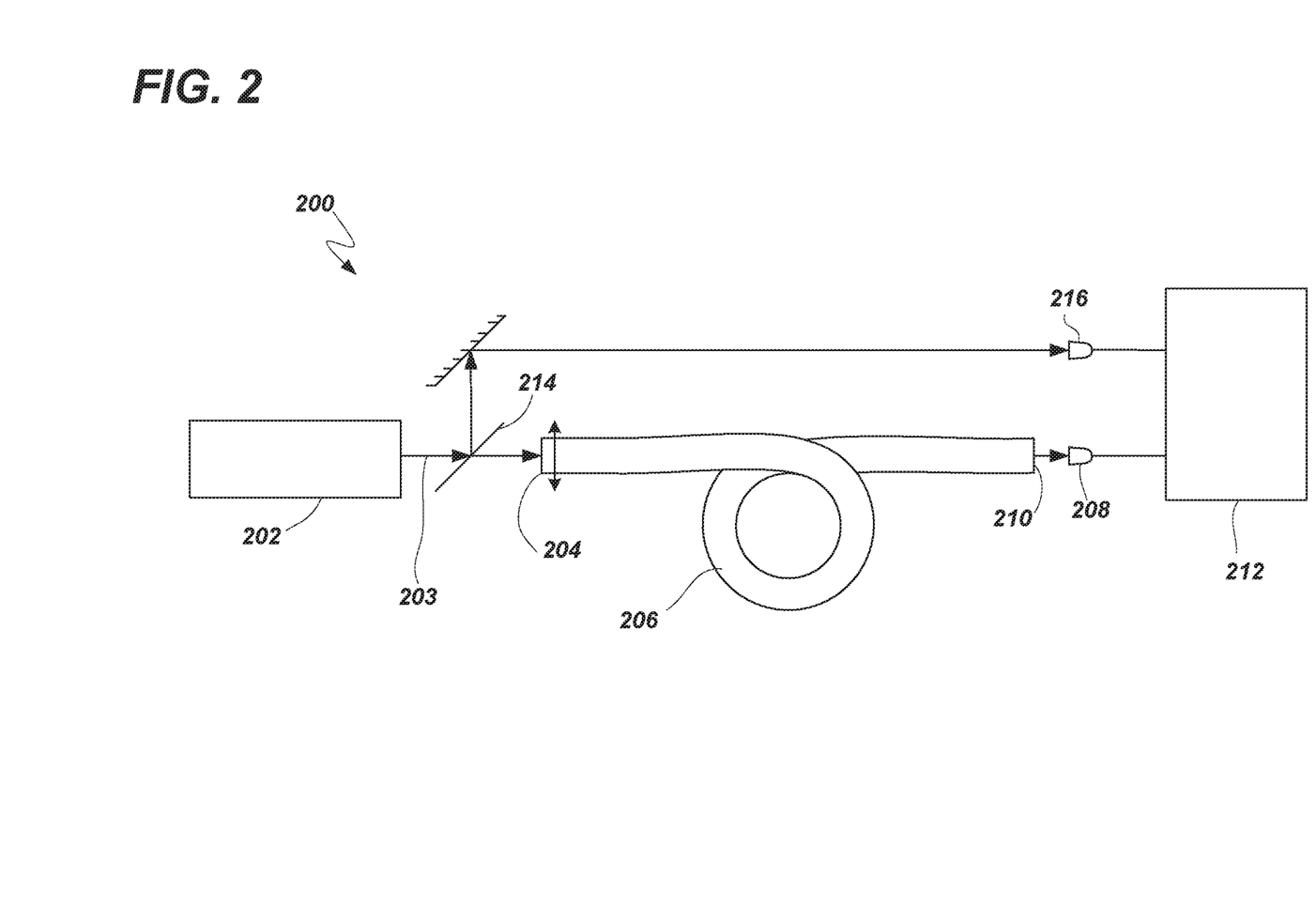
FIG. 2 schematically illustrates an embodiment of a system used to make differential mode delay (DMD) measurements of a multimode optical fiber.

The radial position at which the light pulses enter the input end of the fiber 204 is varied, either by scanning the light beam across the input end of the fiber 204, or scanning the input end of the fiber 204 across the light beam, for example using a translation stage, as indicated by the double-headed arrow. The relative timing of the pulses transmitted through the fiber 206 is measured as a function of the lateral position of the light pulses 204 entering the fiber 206. These measurements may be repeated after rotating the input face 204 of the fiber 206 around its axis, for example in steps of 90°, to ensure that the mode dispersion characteristics are rotationally symmetric.

Figure 3A:
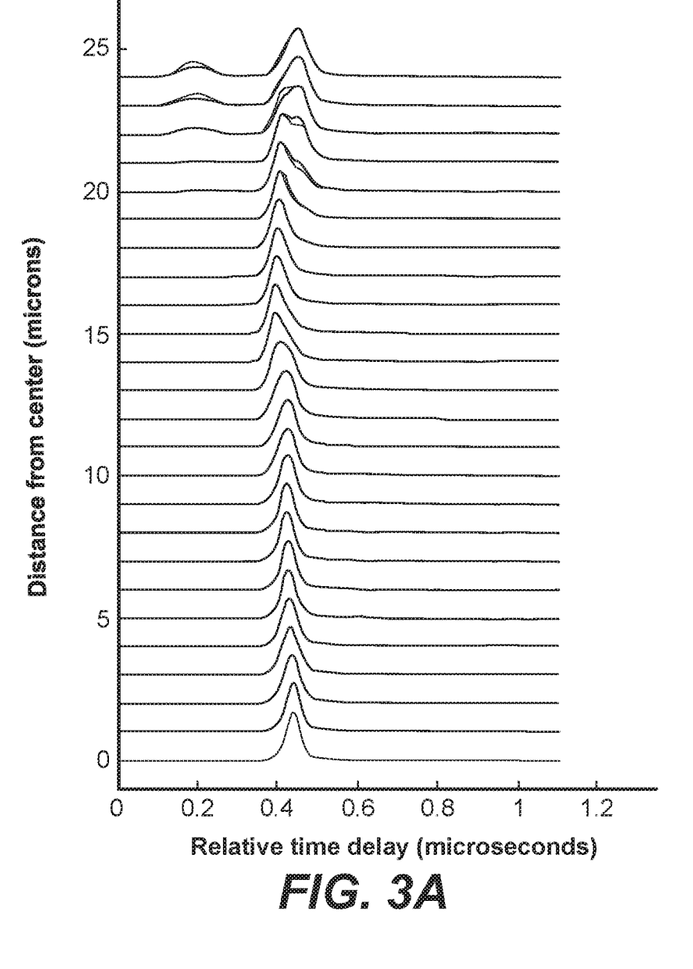
FIGS. 3A and 3B present typical DMD results produced by 1 km lengths of OM3 and OM4 multimode optical fiber respectively.

A first example of results produced using a DMD system is shown in FIG. 3A. In this case, the laser transmitter used a Ti:Al$_2$O$_3$ modelocked laser producing pulses having a $\tau_p$ value of around 30 ps and $\lambda_p$ around 850 nm. The optical fiber being tested was a 1 km length of OM4 multimode optical fiber. The results graphed in FIG. 3A show the relative time of arrival of the light pulses at the first detector when the light entered the input end 204 of the fiber 206 at different distances from the center of the fiber. The lowest trace in FIG. 3A corresponds to the output detected when the light pulses were injected into the fiber 206 at the center of the input face (distance from center of input face=0 μm). The topmost trace corresponds to the output detected when the light pulses were injected into the fiber 206 at the edge of the input face 204 (distance from center of input face=24 μm). As the light pulses are moved from the center to the edge of the input face 204 of the fiber 206, the higher order transmission modes of the fiber 206 are excited. In the example shown in FIG. 3A, the light pulse is distorted and slightly delayed when injected into the edge of the fiber 206 relative to the signal detected when the light is injected into the center of the input face 204.

Figure 3B:
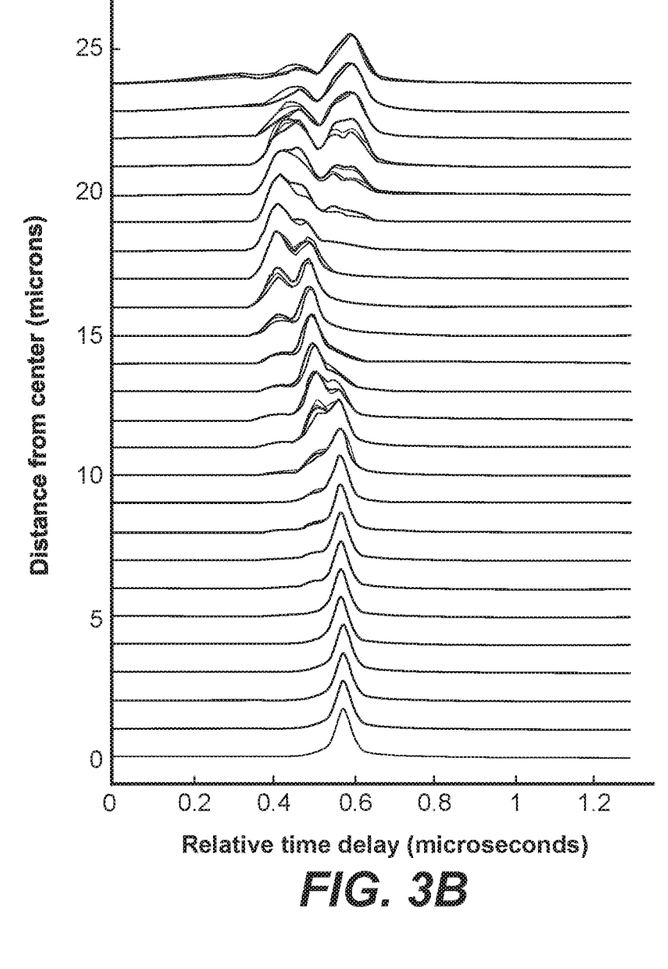

Another example of results, this time obtained using a 1 km length of OM3 multimode optical fiber is shown in FIG. 3B. There is little or no difference in the received pulse for light injected up to about 9 μm from the center of the fiber. At greater distances from the fiber center, however, the detected pulse shape becomes increasingly distorted and subject to a positive or negative delay, depending on the distance from the center of the input face.

The OM3 and OM4 optical fibers discussed with regard to FIGS. 3A and 3B, are optimized for operation at with laser light pulses at 850 nm and have a core diameter of 50 μm and cladding diameter of 125 μm. They are not well suited for multiband operation, e.g. carrying optical signals at a number of different wavelength bands. A wideband, multimode fiber, known as OM5 fiber, has recently become available and is designed for single-wavelength or multi-wavelength transmission systems with wavelengths in the range of 850 nm to 950 nm, as described in the ANSI-TIA-492AAAE standard. OM5 fiber is purported to support at least four low-cost wavelengths in the 850-950 nm range for 40G to 100G bandwidth, with reduced fiber counts for higher speeds, and for short-haul applications. OM5 fiber also has a core of 50 μm diameter and cladding diameter of 125 μm.

Figure 4:
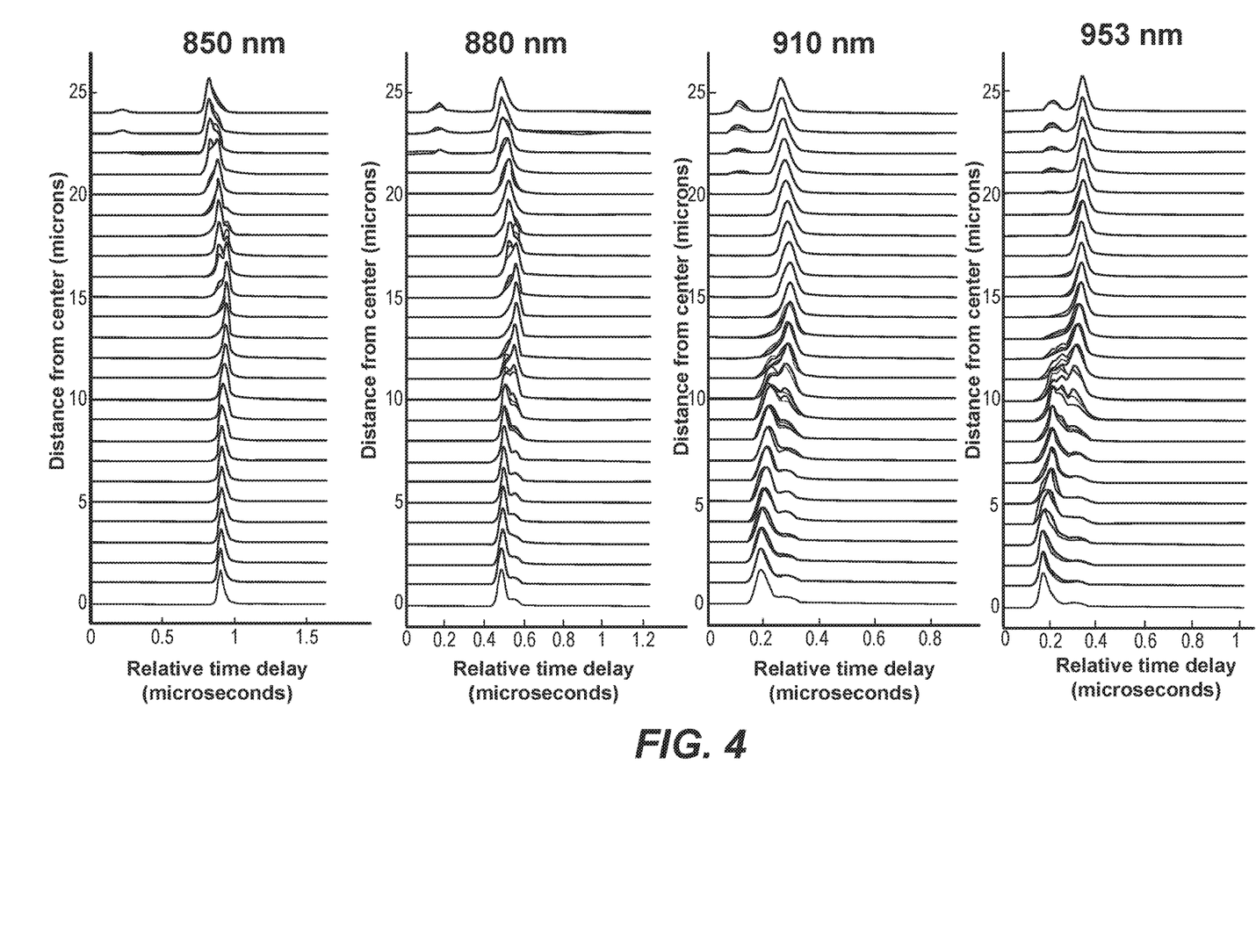
FIG. 4 presents DMD results produced from a 1 km length of broadband multimode optical fiber (OM5 fiber) at four different wavelengths, 850 nm, 880 nm, 910 nm and 953 nm.

FIG. 4 shows DMD measurements for a 1 km length of OM5 wideband, multimode optical fiber taken at four different wavelengths, viz. 850 nm, 880 nm, 910 nm and 953 nm. As can be seen from the figure, at 850 nm there is relatively little delay or distortion of the pulses on moving from an injection position from the center of the input face to the edge of the fiber. The trend at increasing wavelength, however, is for increased pulse distortion and negative delay.

Figure 5:
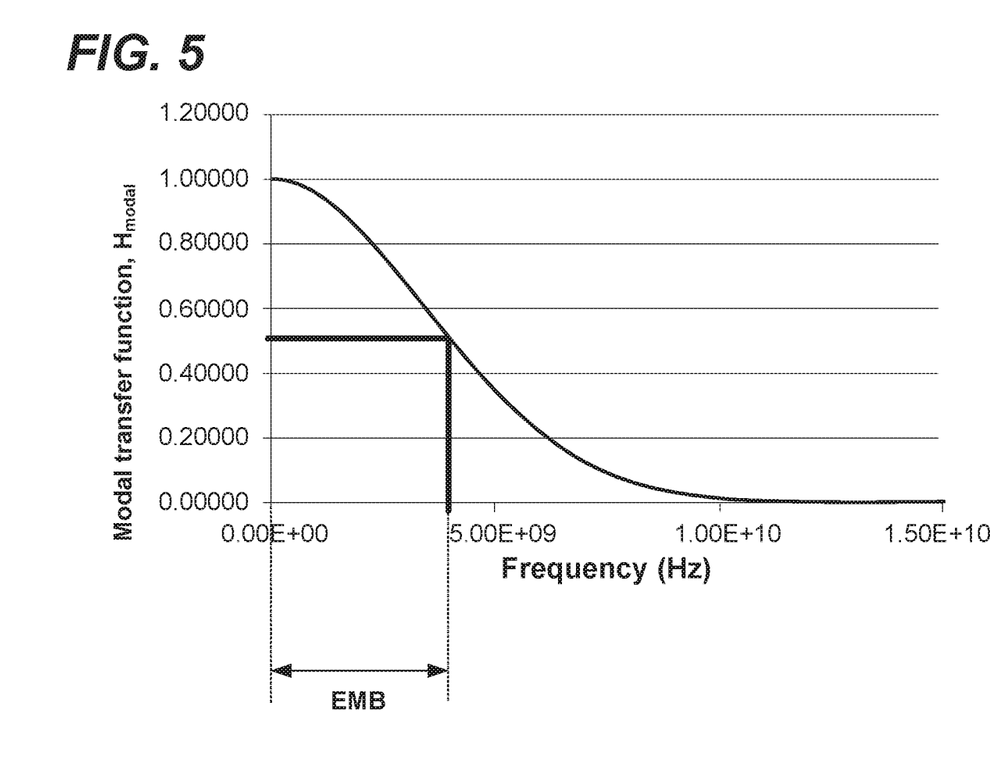
FIG. 5 generally presents a definition of Estimated Mode Bandwidth (EMD) as the half maximum width of the fiber modal transfer function, $H_{modal}(f)$.

One useful measure for the ability of a multimode optical fiber to carry signals is the Estimated Modal Bandwidth (EMB), which represents the bandwidth of the fiber's transfer function, $H_{fib}(f)$, where "f" is frequency. The fiber transfer function, $H_{fib}(f)$ is provided by dividing the Fourier transfer (FT) of the output signal by the Fourier transform of the input signal, i.e.

$$H_{fib}(f)=FT\{Output\}/FT\{Input\} \quad (1)$$

where FT{Output} is the Fourier transform of the linear superposition of the output pulses produced by the DMD measurements, weighted in accordance with Telecommunications Industry Association standards. FT{Input} is the Fourier transform of the input pulse. If the transfer function, $H_{fib}$, is plotted as a function of frequency, EMB can be calculated as the width of the transfer function at half maximum. For example, for the generalized fiber transfer function shown in FIG. 5, the value of EMB is as shown. Since the EMB is calculated for a fiber of a specific length, the units of the EMB are typically in MHz·km.

Figure 6:
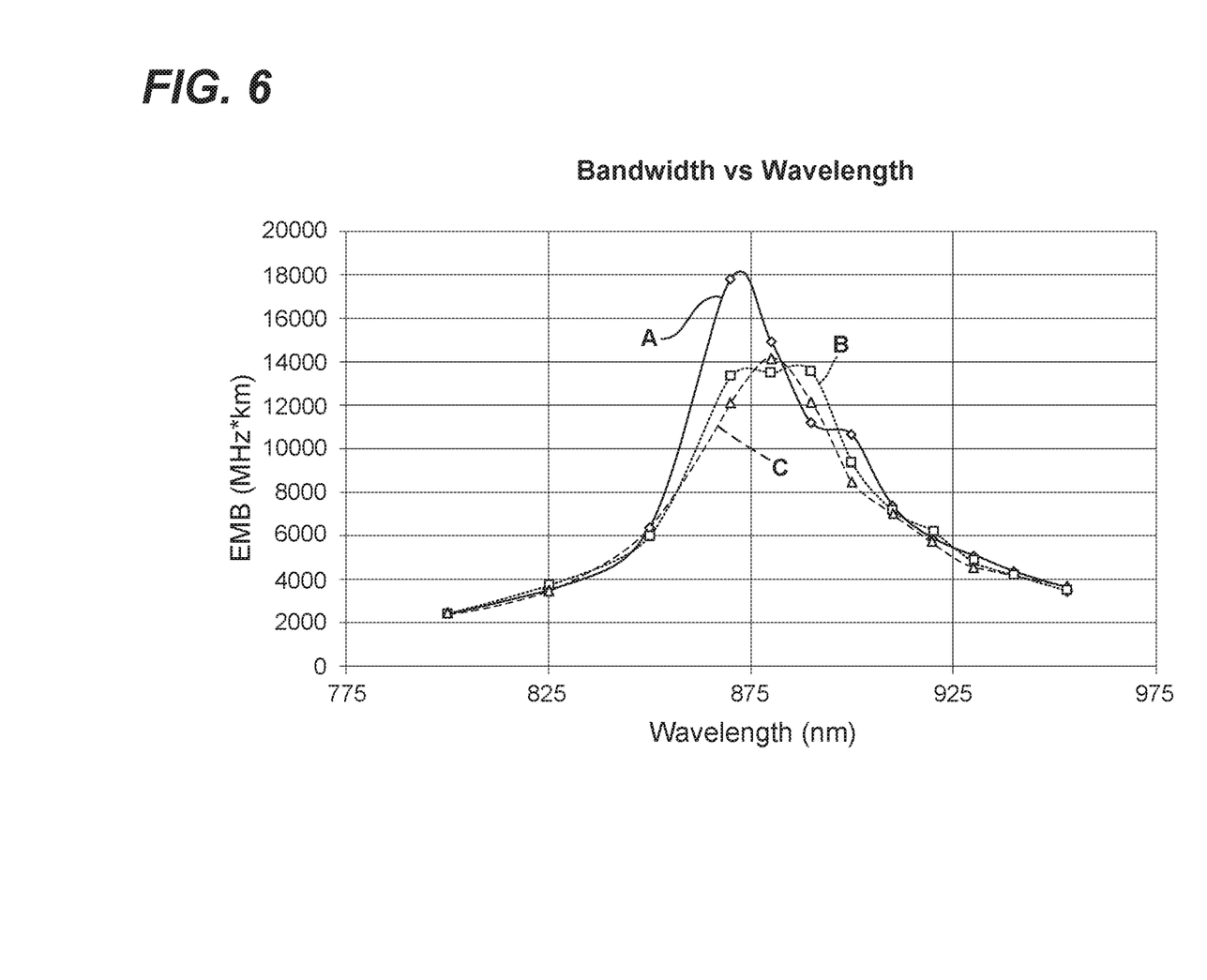
FIG. 6 presents EMB as a function of wavelength, derived from DMD measurements of a broadband multimode (OM5) optical fiber taken on three different days over a one month period.

FIG. 6 shows a graph of EMB as a function of wavelength for the OM5 fiber whose DMD measurements are shown in FIG. 4. The graph shows three curves, A, B and C, taken on three different days over the span of around one month. These curves show a lack of repeatability where the EMB is greater than about 6000 MHz·km: curve A has a substantially taller peak than curves B and C, and curve B has a flattened peak, compared to the single peaks of curves A and C. In this case, $H_{fib}(f)$ was assumed to be equal to the fiber modal transfer function, $H_{modal}(f)$.

Figure 7A:
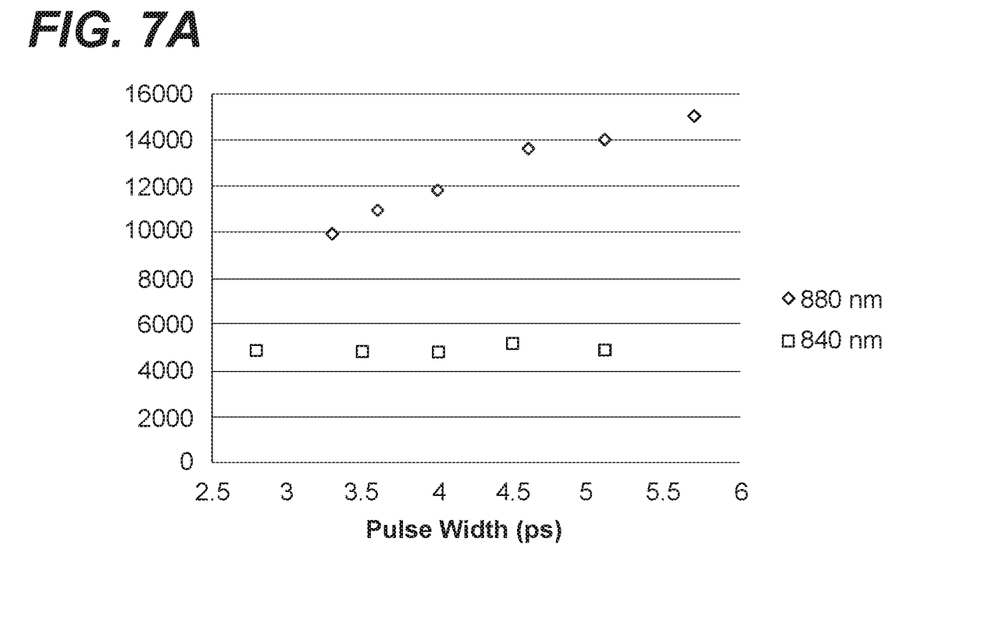
FIG. 7A presents EMB as a function of pulse width for a broadband multimode optical fiber, at two different wavelengths.
Figure 7B:
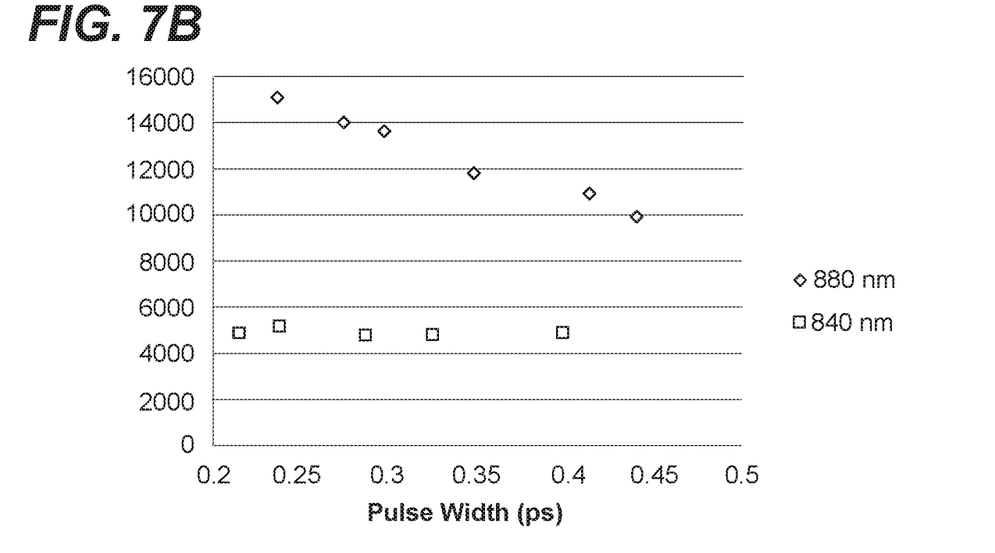
FIG. 7B presents the same results as shown in FIG. 7A but a function of optical pulse bandwidth.

Results of further investigation into the EMB of the OM5 fiber as shown in FIGS. 7A and 7B. FIG. 7A shows the EMB as a function of pulse width at two different wavelengths, 840 nm and 880 nm, over the range 2.5 ps to 5 ps. The laser pulses used to produce these results were generated by a Ti:Al₂O₃ modelocked laser tuned to the appropriate wavelength. The EMB at 840 nm is independent of pulse length, whereas the EMB at 880 nm shows a significant increase with increasing pulse length. The duration of the laser pulses was bandwidth limited so, in each case, an increasing pulse length corresponded to a decreasing bandwidth. Accordingly, FIG. 7B shows the EMB as a function of laser pulse spectral width in nm, over the range of about 0.2 nm to about 0.45 nm. Again, the EMB at 840 nm is essentially independent of bandwidth, whereas the EMB reduces with increasing bandwidth at 880 nm.

As a result of these experiments, it has become apparent to the inventors that the transfer function is not only a modal transfer function, as was previously to be the case, but is also dependent on the chromatic dispersion of the fiber. Thus, the fiber transfer function, $H_{fib}(f)$, is actually the product of the modal transfer function, $H_{modal}(f)$ and the chromatic dispersion transfer function, $H_{CD}(f)$, i.e.

$$H_{fib}(f)=H_{modal}(f) \cdot H_{CD}(f).$$

The chromatic dispersion transfer function, $H_{CD}(f)$, according to G. Agrawal "Fiber-Optic Communication Systems," 3$^{rd}$ ed., Wiley, p. 54, is given by:

$$H_{CD}(f) = \frac{e^{-\frac{1}{2}\left(\frac{f}{f_1}\right)^2 \left(\frac{1}{1+i\frac{f}{f_2}}\right)}}{\sqrt{1+i\frac{f}{f_2}}}$$

where $$f_1 = \frac{1}{2\pi |D| L \sigma}$$

and $$f_2 = \frac{1}{2\pi \left(S + 2\frac{|D|}{\lambda}\right) L \sigma^2}$$

where f is the optical frequency of the light pulse (in Hz), D is the chromatic dispersion of the fiber (including chromatic dispersion due to the core material, cladding material, and the waveguide structure, in ps/(nm·km)), L is the length of fiber (in km), σ is the FWHM spectral width of the pulse (in nm), S is the slope of chromatic dispersion (in ps/(nm²·km)), and λ is the wavelength (in nm).

Thus, the calculated EMB is the half maximum bandwidth of $H_{modal}(f)$, where $$H_{modal}(f) = H_{fib}(f)/H_{CD}(f).$$

Figure 8A:
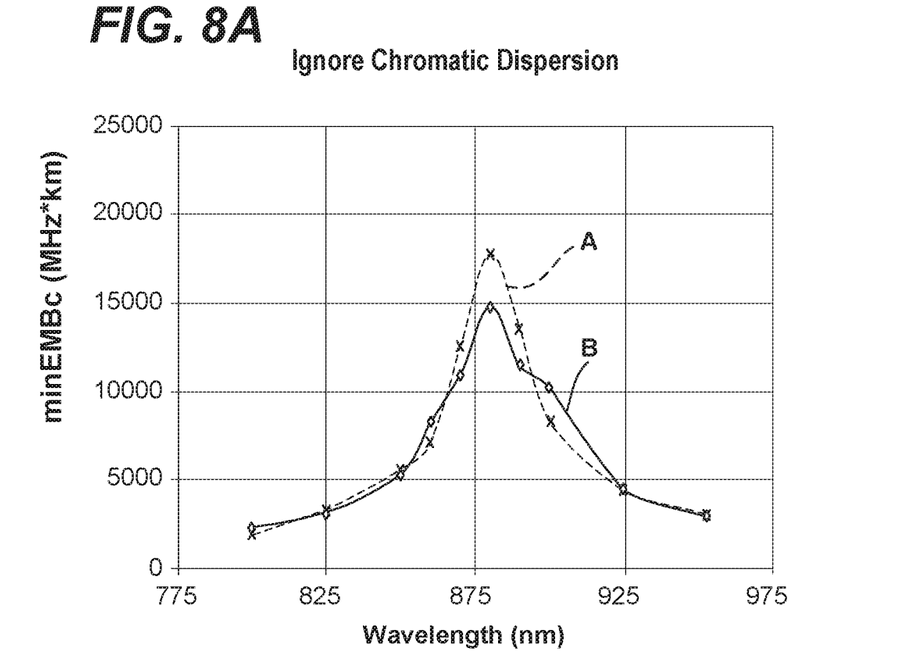
FIG. 8A compares EMB calculated as a function of wavelength for a broadband multimode optical fiber on two different days, without accounting for chromatic dispersion.
Figure 8B:
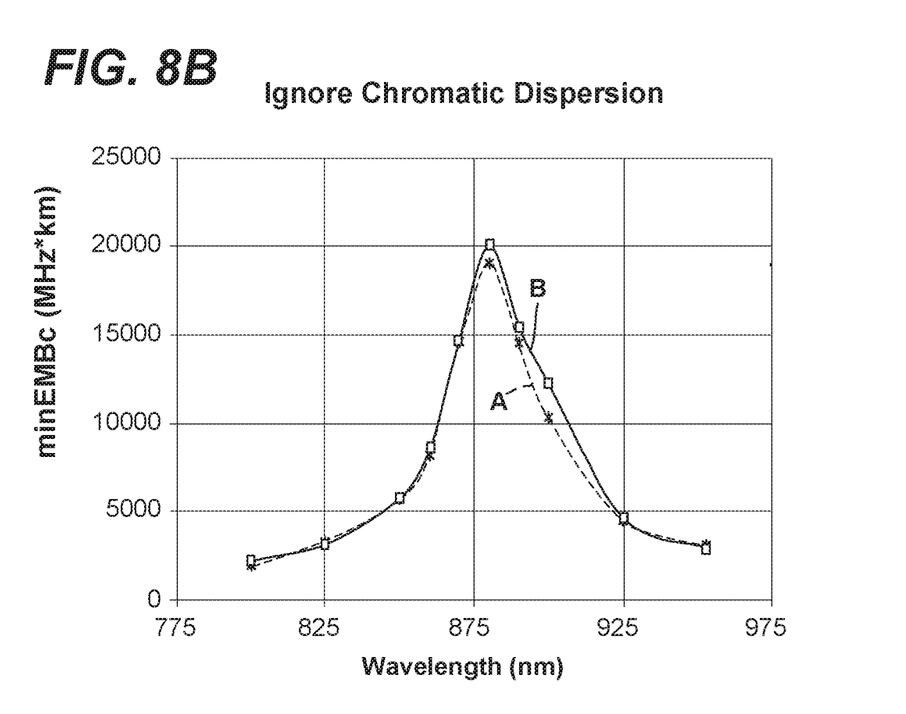
FIG. 8B compares EMB calculated as a function of wavelength for the same broadband multimode optical fiber on the same days as shown in FIG. 8A, but with chromatic dispersion accounts for in the calculation of EMB.

The value of incorporating chromatic dispersion into the calculation of EMB is evident from the results shown in FIGS. 8A and 8B. FIG. 8A illustrates the calculated minEMBc for the same OM5 fiber as was used to generate the results shown in FIG. 4, over the range of wavelengths 800 nm-950 nm, from measurements made on two different days, a week apart, represented by day A and day B. Calculation of the parameter minEMBc is well known, EMB=1.13 minEMBc. The values of minEMBc were calculated without chromatic dispersion. The difference between the peak minEMBc for day A and B is around 17%, and the shape of the EMB curve for day B shows a distinct shoulder on the right side. When chromatic dispersion is included in the calculation for minEMBc, as shown in FIG. 8B, there is greater consistency between the curves. In this case, the difference in peak height between the two curves is around 5% and the shapes of the curves are more similar than in FIG. 8A. Thus, the variability between the curves is reduced when chromatic dispersion is taken into account. Furthermore, the calculated minEMBc is higher for the wavelength range of about 850 nm to about 925 nm. Thus, the minEMBc can also be greater when chromatic dispersion is taken account.

Various modifications, equivalent processes, as well as numerous structures to which the present invention may be applicable will be readily apparent to those of skill in the art to which the present invention is directed upon review of the present specification. The claims are intended to cover such modifications and devices.

As noted above, the present invention is applicable to fiber optical communication and data transmission systems. Accordingly, the present invention should not be considered limited to the particular examples described above, but rather should be understood to cover all aspects of the invention as fairly set out in the attached claims.

LIST OF DRAWING ELEMENTS

100—optical communication system
102—transmitter portion
104—receiver portion
106—fiber optic portion
108—transmitter unit
110—transmitter unit
112—transmitter unit
114—transmitter unit
116—optical signal
118—optical signal
120—optical signal
122—optical signal
124—wavelength multiplexer
126—multiple-wavelength signal
128—optical fiber
130—wavelength demultiplexer
132—receiver unit
134—receiver unit
136—receiver unit
138—receiver unit
200—differential mode delay (DMD) measurement system
202—laser transmitter
203—light pulses
204—input end of optical fiber
206—optical fiber
208—first detector
210—output end of optical fiber
212—analytical unit
214—beam splitter
216—second detector

The invention claimed is:

1. A method of characterizing a multimode optical fiber, comprising: propagating pulses of light along the multimode optical fiber at prescribed radial positions relative to an optical axis of the multimode optical fiber;

detecting output pulses from the multimode optical fiber corresponding to the pulses of light propagated along the multimode optical fiber at the prescribed radial positions relative to the optical axis of the multimode optical fiber; and calculating an estimated modal bandwidth of the multimode optical fiber in a manner that accounts for chromatic dispersion of the multimode optical fiber;

wherein the estimated modal bandwidth is calculated using a chromatic dispersion transfer function, $H_{CD}$, that is independent of position across the optical fiber.

2. A method as recited in claim 1, wherein propagating the pulses of light comprises propagating pulses of light at a first wavelength and at least a second wavelength, and where detecting the output pulses comprises detecting output pulses at the first wavelength and at least the second wavelength.

3. A method as recited in claim 1, wherein the estimated modal bandwidth is calculated as the bandwidth of the modal transfer function, $H_{modal}(f)$, where $$H_{modal}(f) = H_{fib}(f)/H_{CD}(f)$$

$H_{fib}(f)$ is calculated as a linear superposition of the detected output pulses from the multimode optical fiber, and $H_{CD}(f)$ is given by $$H_{CD}(f) = \frac{e^{-\frac{1}{2}\left(\frac{f}{f_1}\right)^2 \left(\frac{1}{1+i\frac{f}{f_2}}\right)}}{\sqrt{1+i\frac{f}{f_2}}}$$

where $$f_1 = \frac{1}{2\pi |D| L \sigma}$$

and $$f_2 = \frac{1}{2\pi \left(S + 2\frac{|D|}{\lambda}\right) L \sigma^2}$$

where f is the optical frequency of the light pulses, D is the chromatic dispersion of the multimode optical fiber, L is the length of multimode optical fiber, σ is the FWHM spectral width of the optical pulses, S is the slope of chromatic dispersion of the core material of the multimode optical fiber, and λ is the wavelength of the optical pulses.

4. A method as recited in claim 1, wherein the multimode optical fiber has a core diameter of 50 μm and a cladding diameter of 125 μm.

5. A method of characterizing a multimode optical fiber, comprising:
propagating pulses of light along the multimode optical fiber at prescribed radial positions relative to an optical axis of the multimode optical fiber;
detecting output pulses from the multimode optical fiber corresponding to the pulses of light propagated along the multimode optical fiber at the prescribed radial positions relative to the optical axis of the multimode optical fiber; and
calculating an estimated modal bandwidth (EMB) of the multimode optical fiber in a manner such that the calculated value of EMB is independent of the spectral width the pulses of light;
wherein the estimated modal bandwidth is calculated using a chromatic dispersion transfer function, $H_{CD}$, that is independent of position across the optical fiber.

6. A method as recited in claim 5, wherein propagating the pulses of light comprises propagating pulses of light at a first wavelength and at least a second wavelength, and where detecting the output pulses comprises detecting output pulses at the first wavelength and at least the second wavelength.

7. A method as recited in claim 5, wherein the estimated modal bandwidth is calculated as the bandwidth of the modal transfer function, $H_{modal}(f)$, where $H_{modal}(f) = H_{fib}(f)/H_{CD}(f)$ $H_{fib}(f)$ is calculated as a linear superposition of the detected output pulses from the multimode optical fiber, and $H_{CD}(f)$ is given by $$H_{CD}(f) = \frac{e^{-\frac{1}{2}\left(\frac{f}{f_1}\right)^2 \left(\frac{1}{1+i\frac{f}{f_2}}\right)}}{\sqrt{1 + i\frac{f}{f_2}}}$$

where $$f_1 = \frac{1}{2\pi |D| L \sigma}$$

and $$f_2 = \frac{1}{2\pi \left(S + 2\frac{|D|}{\lambda}\right) L \sigma^2}$$

where f is the optical frequency of the light pulses, D is the chromatic dispersion of the multimode optical fiber, L is the length of multimode optical fiber, σ is the FWHM spectral width of the optical pulses, S is the slope of chromatic dispersion of the core material of the multimode optical fiber, and λ is the wavelength of the optical pulses.

8. A method as recited in claim 5, wherein the multimode optical fiber has a core diameter of 50 μm and a cladding diameter of 125 μm.

* * * * *

UNITED STATES PATENT AND TRADEMARK OFFICE
CERTIFICATE OF CORRECTION

| | | |
|---|---|---|
| PATENT NO. | : 11,092,739 B2 | Page 1 of 1 |
| APPLICATION NO. | : 16/608590 | |
| DATED | : August 17, 2021 | |
| INVENTOR(S) | : Earl R. Parsons | |

It is certified that error appears in the above-identified patent and that said Letters Patent is hereby corrected as shown below:

On the Title Page (71) Applicant: "COMMSCOPE TECHNOLGOIES LLC," should read --COMMSCOPE TECHNOLOGIES LLC,--

In the Claims

Column 9, Line 25, Claim 5: "width the pulses of light;" should read --width of the pulses of light;--

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*